US012785417B2

(12) United States Patent
Kim

(10) Patent No.: US 12,785,417 B2
(45) Date of Patent: Nov. 3, 2026

(54) POWER SUPPLY FOR BATTERY PACK

(71) Applicant: SAMSUNG SDI CO., LTD., Yongin-si (KR)

(72) Inventor: Taejin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 596 days.

(21) Appl. No.: 18/374,433

(22) Filed: Sep. 28, 2023

(65) Prior Publication Data

US 2024/0186817 A1 Jun. 6, 2024

(30) Foreign Application Priority Data

Dec. 2, 2022 (KR) ........................ 10-2022-0166854

(51) Int. Cl.
*H01M 10/42* (2006.01)
*H02J 7/00* (2026.01)
*H02J 7/34* (2006.01)
*H02J 7/50* (2026.01)
*H02J 9/04* (2006.01)

(52) U.S. Cl.
CPC ..................................... *H02J 7/34* (2013.01); *H02J 7/50* (2026.01); *H02J 9/04* (2013.01); *H02J 2207/20* (2020.01)

(58) Field of Classification Search
CPC ........ H02J 7/34; H02J 7/50; H02J 9/04; H02J 2207/20; H02J 7/63; H02J 9/005; H02J 7/663; H02J 7/855; H02J 7/90; H02J 7/00; H02J 3/32; H02J 2207/10; H01M 10/425; H01M 10/441; H01M 2010/4271
See application file for complete search history.

(56) References Cited

U.S. PATENT DOCUMENTS

2012/0228944 A1* 9/2012 Koshin ..................... H02J 7/34 307/66
2016/0164328 A1 6/2016 Kim
2020/0290479 A1 9/2020 Kumeuchi et al.
2023/0198282 A1* 6/2023 Li ........................... B60L 58/21 320/134
2025/0105662 A1* 3/2025 Sheng ....................... H02J 3/32

FOREIGN PATENT DOCUMENTS

JP 2005-038656 A 2/2005
JP 6131763 B2 5/2017
KR 10-2042392 B1 11/2019

* cited by examiner

*Primary Examiner* — Jamara A Franklin
(74) *Attorney, Agent, or Firm* — Lee IP Law, P.C.

(57) ABSTRACT

A power supply of a battery pack, including a first battery, a second battery, a DC/DC converter for converting a first voltage output by the first battery into a second voltage, a controller for using the second voltage as an operation voltage, a relay connected between the first battery and an input terminal of the DC/DC converter and controlling an electrical connection between the first battery and the input terminal of the DC/DC converter, a first switch connected between an output terminal of the DC/DC converter and a coil of the relay and controlling an electrical connection between the output terminal of the DC/DC converter and the coil, and a second switch connected between the second battery and the coil and controlling an electrical connection between the second battery and the coil.

6 Claims, 4 Drawing Sheets

100

POWER SUPPLY FOR BATTERY PACK

CROSS-REFERENCE TO RELATED APPLICATION

Korean Patent Application No. 10-2022-0166854 filed in the Korean Intellectual Property Office on Dec. 2, 2022, is incorporated herein by reference in its entirety.

BACKGROUND

1. Field

A power supply of a battery pack is disclosed.

2. Description of the Related Art

An energy storage system (ESS) stores a large amount of electrical energy and supplies the stored electrical energy when it is needed to improve energy use efficiency. The energy storage system (ESS) includes a high-voltage battery pack for storing electrical energy, and a battery management system (BMS) for monitoring states of the battery pack and control charging and discharging of the battery pack.

SUMMARY

Embodiments are directed to a power supply of a battery pack, including a first battery, a second battery, a DC/DC converter for converting a first voltage output by the first battery into a second voltage, a controller for using the second voltage as an operation voltage, a relay connected between the first battery and an input terminal of the DC/DC converter and controlling an electrical connection between the first battery and the input terminal of the DC/DC converter, a first switch connected between an output terminal of the DC/DC converter and a coil of the relay and controlling an electrical connection between the output terminal of the DC/DC converter and the coil, and a second switch connected between the second battery and the coil and controlling an electrical connection between the second battery and the coil, wherein opening and closing of the first switch is controlled by the controller, and the second switch is a manual switch opened and closed by physical manipulation The first battery may be a high voltage battery module for configuring the battery pack, and the controller may be a battery management system for controlling charging/discharging of the battery pack.

The second switch may supply an output voltage of the second battery to the coil, and the relay may be closed to transmit the first voltage to the DC/DC converter.

The second voltage may be supplied by the DC/DC converter, the controller may close the first switch, and if the first switch is closed, an output voltage of the DC/DC converter is supplied to the coil.

The power supply further including a first diode connected between the first switch and the coil and transmitting an output voltage of the DC/DC converter to the coil if the first switch is closed, and a second diode connected between the second switch and the coil and transmitting an output voltage of the second battery to the coil if the second switch is closed.

The power supply further comprising a third diode connected between the first switch and the second battery and transmitting an output voltage of the DC/DC converter as a charging voltage of the second battery if the first switch is closed.

BRIEF DESCRIPTION OF THE DRAWINGS

Features will become apparent to those of skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

A power supply of a battery pack according to embodiments will now be described with reference to accompanying drawings.

Figure 1:
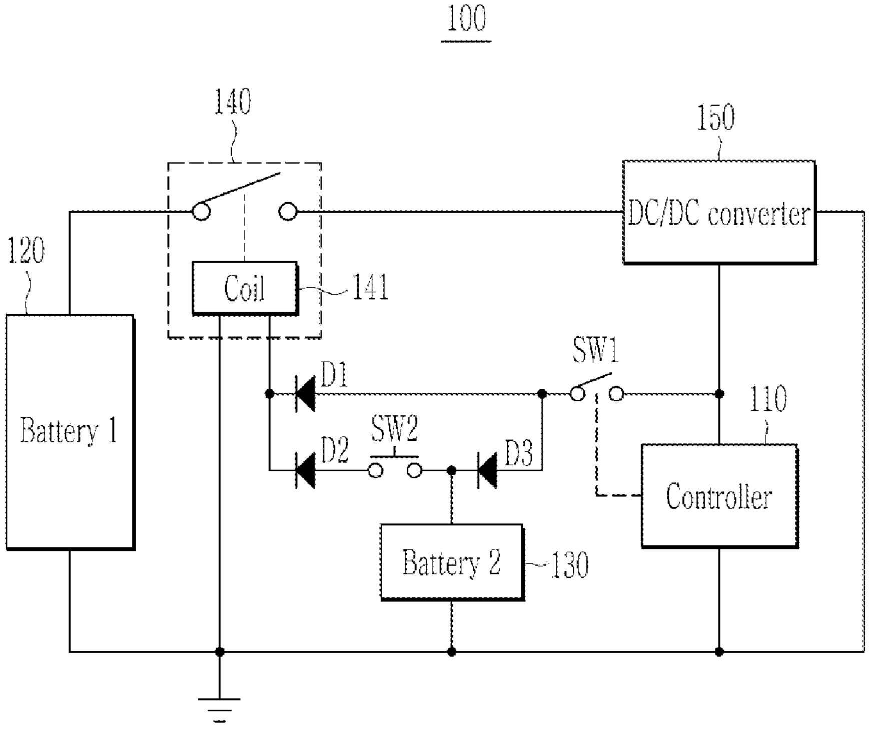
FIG. 1 shows a power supply of a high-voltage battery pack, including multiple batteries, a controller, and a DC/DC converter according to an example embodiment.

FIG. 1 shows a power supply of a high-voltage battery pack, including multiple batteries, a controller, and a DC/DC converter according to an example embodiment. Referring to FIG. 1, the power supply 100 of the high voltage battery pack according to an embodiment may include a controller 110, a first battery 120, a relay 140, and a DC/DC converter 150.

The controller 110 may be a battery management system (BMS) for monitoring the high voltage battery pack and controlling charging/discharging of the high voltage battery pack. The controller 110 may control a supply of power voltage to a coil 141 of the relay 140 and may control opening/closing of the relay 140.

The first battery 120 may be a high-voltage battery module configuring the high voltage battery pack. For example, the first battery 120 may be a battery module in which a plurality of cells are connected in series or in parallel and which may provide an output voltage of about 1000V.

The relay 140 may be connected between the first battery 120 and an input terminal of the DC/DC converter 150 and may selectively transmit an output voltage of the first battery 120 to the DC/DC converter 150. The relay 140 may switch contact state of nodes by a current flowing to the coil 141, may transmit an output voltage of the first battery 120 to the DC/DC converter 150 in a node contacting state, and may block the output voltage of the first battery 120 from being transmitted to the DC/DC converter 150 in a node opening state.

The DC/DC converter 150 may, when receiving the output voltage of the first battery 120 through the relay 140, convert the output voltage into another level of voltage and may output the same. For example, the DC/DC converter 150 may, when receiving the voltage of 1000V from the first battery module 110, may convert it into the voltage of 24V and may output the same. The voltage supplied through the output terminal of the DC/DC converter 150 may be supplied as an operation voltage of the controller 110.

According to what is described in the above, regarding the power supply 100, when the relay 140 is closed (i.e., in a node contacting state), the voltage of the first battery 120 is supplied to the DC/DC converter 150 so the DC/DC converter 150 may supply an operation voltage of the controller 110. When there is no need to supply the operation voltage to the controller 110, power consumption may be reduced by opening the relay 140.

In this case, however, when the relay 140 is opened, it is also blocked to supply a power voltage to the DC/DC converter 150 and the controller 110, so a method for controlling the relay 140 to be closed (i.e., a node contacting state) while the relay 140 is opened, and starting to supply the power voltage to the DC/DC converter 150 and the controller 110 is needed. The power supply 100 may, to solve this problem, operate the relay 140 by using the second battery 130 at its initial driving to supply the power voltage to the DC/DC converter 150 and the controller 110.

To achieve this, the power supply 100 may include a second battery 130, two switches SW1 and SW2, and two diodes D1 and D2. The second battery 130 may be a charged/discharged battery module for supplying the power voltage necessary in an emergency situation, such as when supplying power voltage during firefighting via an energy storage system (ESS), including a high voltage battery pack. For example, the second battery 130 may be a battery module for providing an output voltage of about 24V.

The switch SW1 and the diode D1 may be electrically connected between an output terminal of the DC/DC converter 150 and the coil 141 of the relay 140, and may selectively transmit the output voltage of the DC/DC converter 150 to the coil 141 of the relay 140. The switch SW2 and the diode D2 may be electrically connected between the second battery 130 and the coil 141 of the relay 140 and may selectively transmit the output voltage of the second battery 130 to the coil 141 of the relay 140.

The switch SW1 may be electrically connected between an output terminal of the DC/DC converter 150 and the diode D1, and its opening/closing may be controlled by the controller 110. When the switch SW1 is closed, it may transmit the output voltage of the DC/DC converter 150 to the diode D1. When the switch SW1 is opened, it may block the output voltage of the DC/DC converter 150 from being transmitted to the diode D1. The switch SW1 may be a switch of which opening/closing is controlled by electrical signals generated by a relay, a contactor, or a semiconductor switch.

The switch SW2 may be electrically connected between the second battery 130 and the diode D2, and its opening/closing may be manually controlled by a manager. When the switch SW2 is closed, it may transmit the output voltage of the second battery 130 to the diode D2. When the switch SW2 is opened, it may prevent the output voltage of the second battery 130 from being transmitted to the diode D2. The switch SW2 may be a switch of which opening/closing is manually controlled by a physical manipulation, such as a push switch, slide switch, lever switch, etc. In other words, the second switch, SW2, is a manual switch, controllable by a human operator.

An anode of the diode D1 may be electrically connected to the switch SW1, and a cathode thereof may be electrically connected to the coil 141 of the relay 140. An anode of the diode D2 may be electrically connected to the switch SW2, and a cathode thereof may be electrically connected to the coil 141 of the relay 140. The diodes D1 and D2 may be operable as an OR circuit and may transmit the output voltage of the DC/DC converter 150 or the output voltage of the second battery 130 as the driving voltage of the coil 141 of the relay 140.

Figure 2:
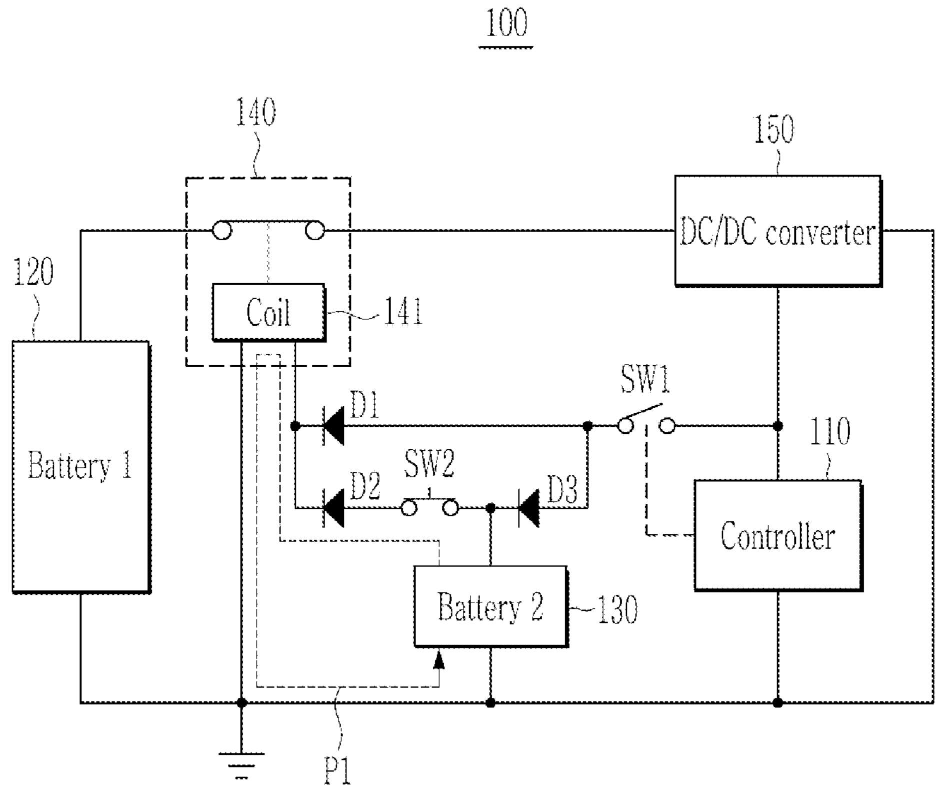
FIG. 2 shows an operation for supplying a power voltage when a power supply is driven in an earlier stage according to an example embodiment.
Figure 3:
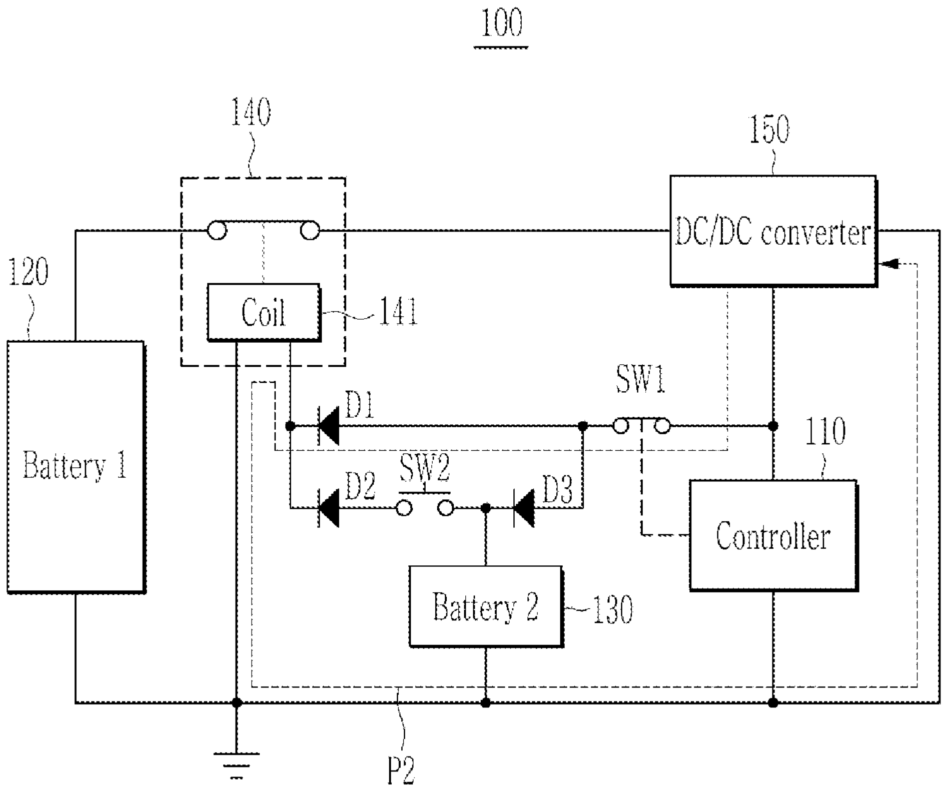
FIG. 3 shows an operation for supplying a power voltage after a power supply is driven in an earlier stage according to an example embodiment.

FIG. 2 shows an operation for supplying a power voltage when a power supply is driven in an earlier stage according to an example embodiment. FIG. 3 shows an operation for supplying a power voltage after a power supply is driven in an earlier stage according to an example embodiment.

Referring to FIG. 2, when the power supply 100 is initially driven, a current path P1 may be connected between the second battery 130 and the coil 141 of the relay 140 by the manually manipulated switch SW2. Accordingly, the relay 140 may be switched closed by the output voltage of the second battery 130, and the output voltage of the first battery 120 may be transmitted to the DC/DC converter 150 through the relay 140. The output voltage of the DC/DC converter 150 may be supplied to the controller 110, and the controller 110 may start to be operated.

Referring to FIG. 3, the controller 110 may control the switch SW1 closed so that the relay 140 may be continuously driven. Hence, a current path P2 connected between the DC/DC converter 150 and the coil 141 of the relay 140, and the relay 140 may be controlled to be closed by the output voltage of the DC/DC converter 150. Therefore, the relay 140 may be continuously closed when the switch SW2 is opened.

While the high voltage battery pack is operated, the supplying of a control power voltage by the high voltage battery pack may be blocked because of an over-discharge of the first battery 120. In this case, the controller 110 may open the relay 140 by opening the switch SW1. When the control power voltage needs to be supplied to the high voltage battery pack, the DC/DC converter 150 may be driven by controlling the relay 140 to be closed by manipulating the switch SW2.

Referring to FIG. 1, the power supply 100 may further include a charging circuit for charging the second battery 130 by using the output voltage of the DC/DC converter 150. The charging circuit may include a diode D3. An anode of the diode D3 may be electrically connected to a node between the switch SW1 and the diode D1, and a cathode of the diode D3 may be electrically connected to the second battery 130.

Figure 4:
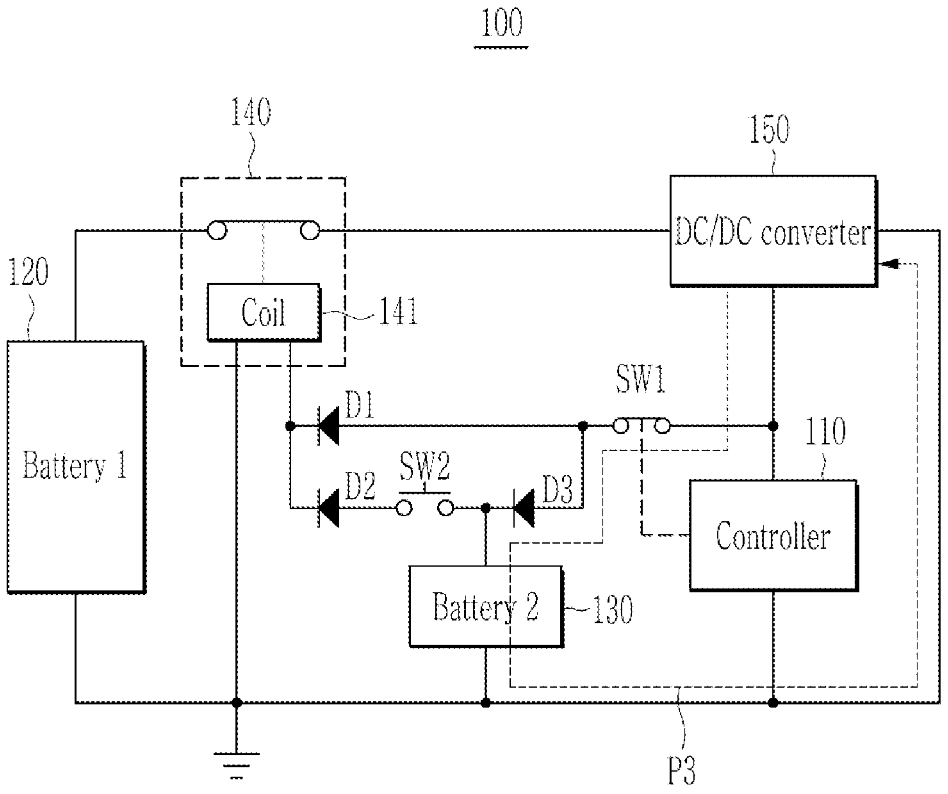
FIG. 4 shows an operation for charging a second battery in a power supply according to an example embodiment.

FIG. 4 shows an operation for charging a second battery in a power supply according to an example embodiment. Referring to FIG. 4, when the switch SW1 is closed, a current path P3 may be connected between the DC/DC converter 150 and the second battery 130 by the diode D3. The output voltage of the DC/DC converter 150 may be transmitted to the second battery 130 through the current path P3, and the second battery 130 may then be charged. In this instance, the output voltage of the DC/DC converter 150 may be reduced by a predetermined voltage (e.g., about 0.3V to 0.7V) by the diode D3 and the reduced output voltage of the DC/DC converter 150 may then be transmitted to the second battery 130, thereby delaying a deterioration rate of the second battery 130.

According to the embodiment, when no operation of the controller 110 is needed, the power supply 100 may reduce power consumption by using the relay 140 and blocking the input voltage of the DC/DC converter 150 for supplying an operation voltage to the controller 110.

It is also possible to supply the power voltage to the DC/DC converter 150 and the controller 110 by using the switch SW2 that may be manually manipulated and temporarily providing the output of the second battery 130 to the relay 140. Further, the charging voltage of the second battery 130 may be maintained by configuring the circuit so that the second battery 130 may be charged by the output of the DC/DC converter 150 when the DC/DC converter 150 is operated.

By way of summation and review, the energy storage system may use a switched mode power supply (SMPS) to supply a control voltage (e.g., an operation voltage of the BMS) to the battery pack. The switched mode power supply (SMPS) may convert an alternating current (AC) voltage input by an AC source into a direct current (DC) voltage and may supply the same as a control voltage of the battery pack. This is a relatively inexpensive way to configure the switched mode power supply (SMPS), but requires a costly installation of an AC system power source.

Therefore, recently, attempts have been made to use not the system power source but an internal power source battery voltage and a DC/DC converter to supply a control voltage to the battery pack in the energy storage system (ESS). However, when using an internal power source battery voltage and a DC/DC converter, a method for driving the DC/DC converter is needed while an internal power voltage of the battery pack is blocked and a control voltage is not normally supplied to the battery pack. The present disclosure provides a power supply of a battery pack for supplying an operating power voltage to a controller of the battery pack by driving a DC/DC converter while no initial power voltage is applied. According to the present disclosure, the power supply of the battery pack may be manufactured with a low cost by using the internal voltage of the battery pack and the DC/DC converter to supply the control voltage to the battery pack. Further, the operating power voltage may be supplied to the controller of the battery pack by driving the DC/DC converter while no initial power voltage is input.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

Moreover, in the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In the present specification, the term "and/or" includes all or random combinations of a plurality of items that are related and arranged. When the embodiments of the present invention are described, the use of "may" signifies "at least one embodiment of the present invention". A singular term may include a plural form unless stated in another way.

Terms including ordinal numbers such as first, second, and the like will be used only to describe various components, and are not to be interpreted as limiting these components. The terms are only used to differentiate one component from other components. For example, a first constituent element could be termed a second constituent element, and similarly, a second constituent element could be termed a first constituent element, without departing from the scope of the present invention.

In the present document, when one component or layer is described as "on", "connected", or "coupled" for other components or layers, "on", "connected" and "coupled" include all formed directly or by interposing one or more other components or layers. In addition, when it is disclosed that one component or a layer is "between" two components or layers, it should be appreciated that the corresponding component or layer is a single component or layer or there are one or more interposed other elements or layers.

Electric connection of two constituent elements includes not only a case where the two constituent elements are directly connected, but also a case where the two constituent elements are connected through another constituent element interposed therebetween. Other constituent elements may include a switch, a resistor, a capacitor, and the like. In describing the embodiments, the expression "connection" means electrical connection unless there is an expression "direct connection".

What is claimed is:

1. A power supply of a battery pack, comprising:
- a first battery;
- a second battery;
- a DC/DC converter for converting a first voltage output by the first battery into a second voltage;
- a controller for using the second voltage as an operation voltage;
- a relay connected between the first battery and an input terminal of the DC/DC converter and controlling an electrical connection between the first battery and the input terminal of the DC/DC converter;
- a first switch connected between an output terminal of the DC/DC converter and a coil of the relay and controlling an electrical connection between the output terminal of the DC/DC converter and the coil; and
- a second switch connected between the second battery and the coil and controlling an electrical connection between the second battery and the coil,
- wherein opening and closing of the first switch is controlled by the controller, and the second switch is a manual switch opened and closed by a physical manipulation.

2. The power supply as claimed in claim 1, wherein the first battery is a high voltage battery module for configuring the battery pack, and the controller is a battery management system for controlling charging/discharging of the battery pack.

3. The power supply as claimed in claim 1, wherein if an output voltage of the second battery is supplied to the coil by the second switch, the relay is closed to transmit the first voltage to the DC/DC converter.

4. The power supply as claimed in claim 1, wherein:

if the second voltage is supplied by the DC/DC converter, the controller closes the first switch, and if the first switch is closed, an output voltage of the DC/DC converter is supplied to the coil.

5. The power supply as claimed in claim 1, further comprising:

a first diode connected between the first switch and the coil and transmitting an output voltage of the DC/DC converter to the coil if the first switch is closed, and a second diode connected between the second switch and the coil and transmitting an output voltage of the second battery to the coil if the second switch is closed.

6. The power supply as claimed in claim 1, further comprising a third diode connected between the first switch and the second battery and transmitting an output voltage of the DC/DC converter as a charging voltage of the second battery if the first switch is closed.

* * * * *